United States Patent [19]

Höne et al.

[11] Patent Number: 4,566,871
[45] Date of Patent: Jan. 28, 1986

[54] APPARATUS FOR MAKING A PARISON FOR BLOWMOLDING OF A HOLLOW ARTICLE

[75] Inventors: Norbert Höne; Claus Horwege; Otto Rosenkranz, all of Hamburg, Fed. Rep. of Germany

[73] Assignee: Krupp Corpoplast Maschinenbau GmbH, Fed. Rep. of Germany

[21] Appl. No.: 573,697

[22] Filed: Jan. 25, 1984

Related U.S. Application Data

[62] Division of Ser. No. 335,884, Dec. 30, 1981, Pat. No. 4,499,044.

[51] Int. Cl.$^4$ .............................................. B29D 23/03
[52] U.S. Cl. ................................... 425/525; 425/529
[58] Field of Search ....................... 264/530, 532, 533; 425/392, 525, 529

[56] References Cited

U.S. PATENT DOCUMENTS

| | | | |
|---|---|---|---|
| 3,969,060 | 7/1976 | Rosenkranz et al. | 425/525 |
| 4,065,535 | 12/1977 | Legrand | 425/525 |
| 4,108,937 | 8/1978 | Martineu et al. | 264/89 |
| 4,119,394 | 10/1978 | Cary | 425/525 |
| 4,317,793 | 3/1982 | Hubert et al. | 425/525 |

FOREIGN PATENT DOCUMENTS 1513067  6/1978  United Kingdom .

Primary Examiner—Peter Kratz
Assistant Examiner—Timothy W. Heitbrink
Attorney, Agent, or Firm—Andrus, Sceales, Starke & Sawall

[57] ABSTRACT

The heated end of a parison is brought into a finish mold form to shape a finish profile suitable for setting up a closure. The parison is axially stretched by a stretch pin to pull out the heated plastic material adjacent the profile to a thinner cross section. This allows to obtain a considerable saving of weight of the plastic material.

6 Claims, 4 Drawing Figures

APPARATUS FOR MAKING A PARISON FOR BLOWMOLDING OF A HOLLOW ARTICLE

This is a division of application Ser. No. 335,884, filed Dec. 30, 1981, now U.S. Pat. No. 4,499,044, issued Feb. 12, 1985.

BACKGROUND OF THE INVENTION

The invention relates to a method and an apparatus for making a parison for blow molding a hollow article made of thermoplastic material, in particular a bottle. In the invention which a parison having a closed bottom is used, in the end of the parison opposite the closed bottom is heated to welding and shaping temperature which end is inserted into a finish mold form including a forming mandrel. The forming mandrel is axially moved forwardly into the parison to urge the finish portion of the parison into contact with the finish mold. Then the final finish profile suitable for setting up a closure is shaped by applying a pressure medium.

In the prior art (German Pat. No. 25 43 640) of forming the finish portion of a bottle a tapered mandrel enters the free end of a cylindrical parison which end has been heated to welding and shaping temperature. The tapered mandrel displaces the heated plastic material partly into the profile of an outer mold, whereupon the final shaping of the closure thread profile is obtained by air pressure which forces the heated material into contact with the outer form. The known method particularly permits production of a finish of a diameter which is larger than the diameter of the original parison.

SUMMARY OF THE INVENTION

The present invention has the object to provide a method and apparatus for making parison having substantially lower weight. In other words it is an object of invention to make hollow bodies of parisons which have smaller weight and thus a smaller volume of plastic material than before.

According to the invention the upper portion of the parison is enclosed in the finish mold and the heated material adjacent the enclosed portion is axially stretched by a stretching pin and is pulled out to a thinner wall thickness.

Referring again to the prior art method as explained above the material is displaced at a ratio of >2 when the forming mandrel enters the free end of a parison to shape the finish portion. With plastic materials suitable for stretching while being blown which materials are stretched in the blowing step at the ratio of about 10 to become biaxially oriented, the orientation of the plastic material begins at stretching at a ratio of 2 in a temperature range as it is necessary to form the material in making the finish portion. The forming mandrel substantially displacing material in entering the parison results in a presolidification of the material. Therefore parts of the parison adjacent the finish portion which parts are to be blown into the neck portion of the bottle incompletely participate if at all in the stretching. This results in a wall thickness being too thick in the neck portion as the material may be not stretched sufficiently in this area. Moreover the displacement of the material in entering the forming mandrel may possibly lead to some portions of the finish portion becoming oversheared which results in a white colouring of the final bottle.

The invention avoids these drawbacks in that the portion of the parison which becomes the neck portion of a bottle in the subsequent blowing step is axially stretched, wherein the stretching of the material is little in contrast to the displacement of material by means of a forming mandrel to prevent any presolidification of the plastic material. Therefore the material of the portion pulled out fully participates in the subsequent blowing and stretching step to obtain the final bottle in which the neck portion is thus provided with a thinner wall thickness.

It should be understood that the cross section of the finish portion of the parison as well as the adjacent portion which later forms the neck portion of the bottle to be blown is substantially reduced in the axial pulling step. The smaller wall thickness or, respectively, thinning out the cross section increases the length of the parison remaining which is blown to the bottle body so that totally at least 10% of the weight of the parison is saved. In other words according to the invention the length of the parison may be reduced at at least 10% to obtain a bottle of a certain dimension when compared with the prior art method.

A further aspect of the invention should be seen in the fact that the finish portion of the parison is brought into a clamping engagement with the finish mold by means of the forming mandrel. In particular, merely the upper finish portion is extended by the forming mandrel to displace plastic material into recesses of the mold. In this way the upper finish end of the parison is firmly gripped by the outer finish mold whereupon the axial pull of the heated portion adjacent the gripped portion is initiated.

In a further embodiment of the invention the closed bottom of the parison is clamped between the stretching pin and a sleeve holding the parison from outside. After extending the stretching pin and engaging the closed bottom of the parison the sleeve gives way during the further pulling step until the holding sleeve contacts an abutment which is axially adjustable to control the stroke of the stretching pin.

Other objects of the invention will appear from the following description and claims.

Figure 1A:
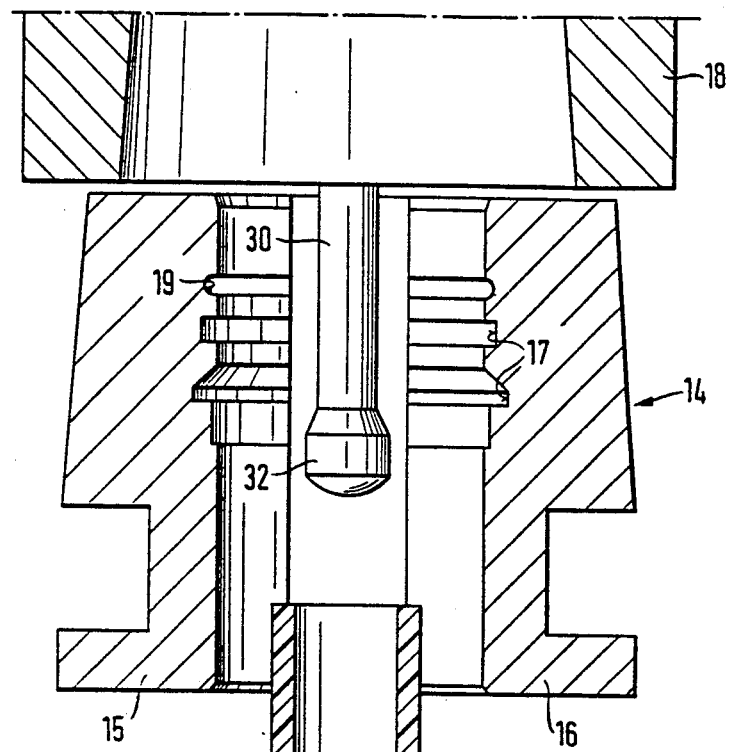
FIGS. 1A and 1B are a schematic cross-sectional view through a parison including holding sleeve and finish mold (FIG. 1A) and through an actuating means including the forming mandrel and the stretching pin (FIG. 1B) wherrein the finish mold is opened and the forming mandrel and stretching pin are in their retracted position.
Figure 1B:
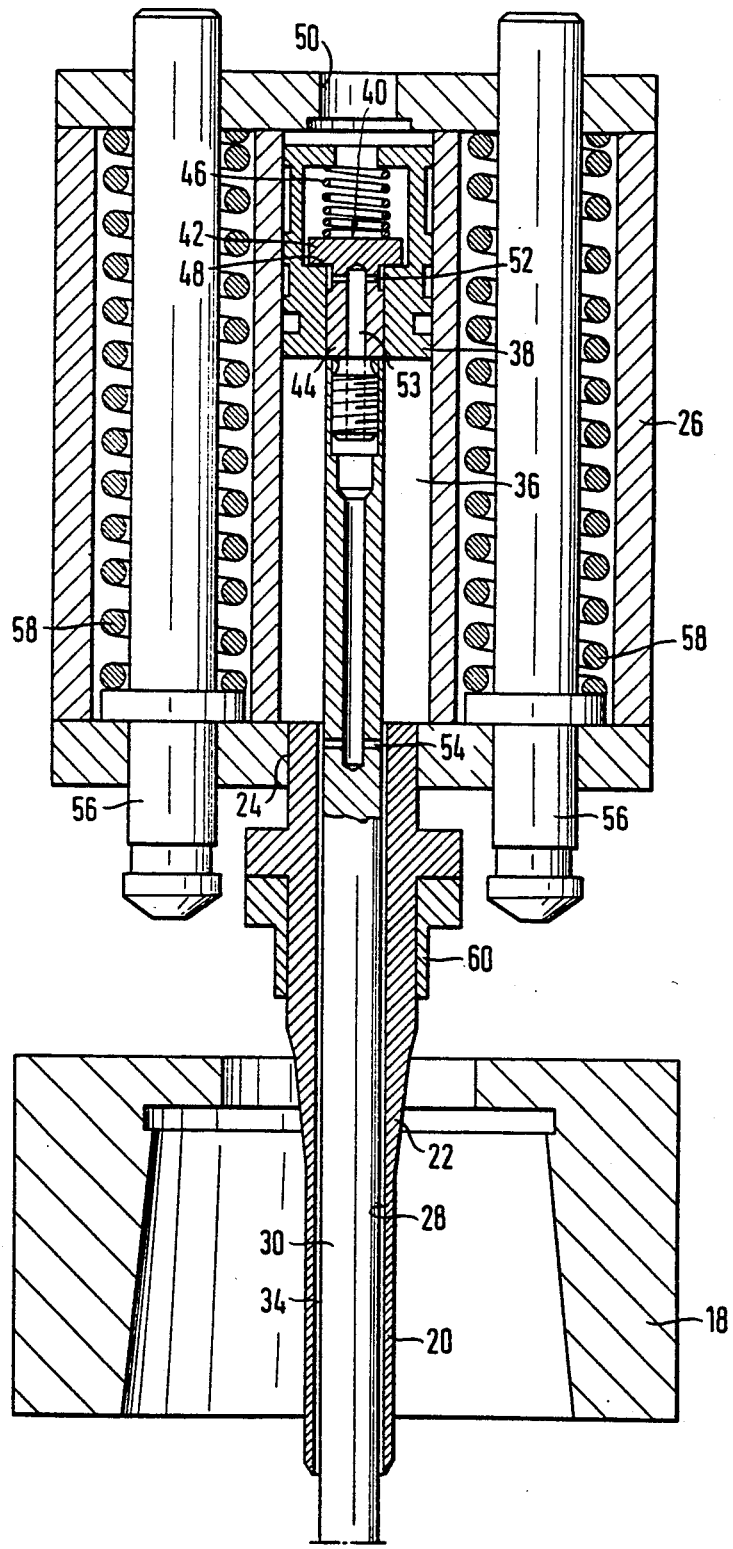

FIG. 1A shows the lower part of the apparatus and FIG. 1B the upper part atop of FIG. 1A. A cylindrical parison 10 having a closed bottom portion is held in a sleeve 12 which may be formed to be a transfer pin which serves to transport the parison 10 from a heating means in which the upper end of the parison only is heated to welding and shaping temperature into alignment with a finish mold form 14. The finish mold form 14 comprises a pair of mold sections 15 and 16, the internal walls thereof providing recesses 17 having a profile which allows to form a threaded contour for a screw cap, for example.

Figure 3:
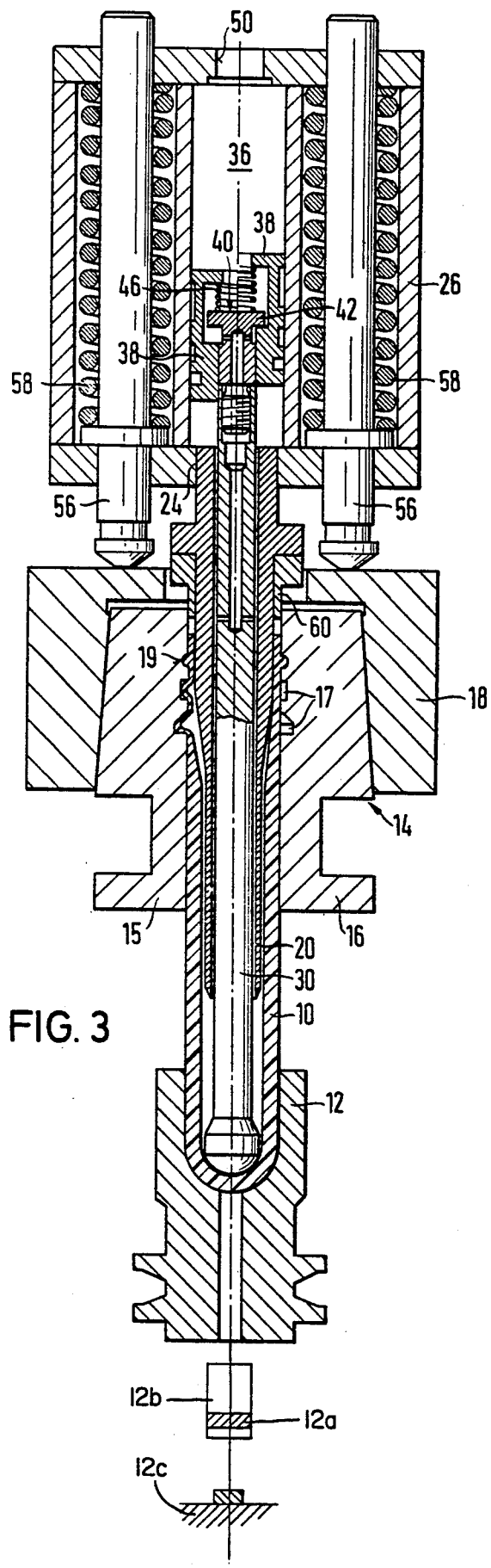

Referring now to FIG. 1B showing a bell-shaped locking member 18 which is located atop the finish mold form 14. The locking member 18 is placed on the finish mold form after the mold sections 15 and 16 have been closed. Atop of the parison 10 is further a forming mandrel 20 having a tapered shoulder 22. The upper end of the forming mandrel 20 is secured to a casing 26 as shown at 24, which casing is connected to an actuating means not shown to displace the forming mandrel from its retracted position shown in FIG. 1 into its lower forward position shown in FIG. 3. A pressurized air-operated cylinder-piston-unit may be provided to drive the casing 26 or, respectively, the forming mandrel 20 up and down.

The forming mandrel 20 has a central bore 28 through which a stretching pin 30 slidingly extends. The lower end of the stretching pin 30 is provided with a crowned head 32. To apply a blowing medium such as pressurized air into the parison 10, an annular space or at least a port 34 is provided between the outer periphery of the stretching pin 30 and the inner periphery of the forming mandrel 20.

The casing 26 further provides for a cylindrical bore 36 in which a piston 38 slidingly fits. The piston 38 includes a valve 40 comprising a closure member 42 which is connected to an extension 44 of the stretching pin 30 which extension extends through the piston. Further the closure member 42 is urged towards the valve seat 48 of the piston 38 by a spring 46. Pressurized air may be applied through a port 50 to the piston 38. The value 40 opens when the stretching pin 30 engages an abutment, the pressure medium displacing the piston 38 against the force of the spring 46 from which it results that the piston 38 lifts off the closure member 42. Then air pressure may enter through port 52 provided in the extension 44 of the stretching pin 30, a central bore 53 and ports 54 into the annular space 34 between the stretching pin and forming mandrel.

Furthermore the casing 26 is provided with abutment pins 56 which are urged into the position shown in the drawings by springs 58 being housed in the casing 26. As shown in FIG. 1B the piston 38 and thus the stretching pin 30 are shown in their upper retracted position. The casing 26 including the forming mandrel 20 both are shown to be retracted in their upper position. The parison 10 shown in FIG. 1A is held in a lower position ready for insertion into the finish mold.

Figure 2:
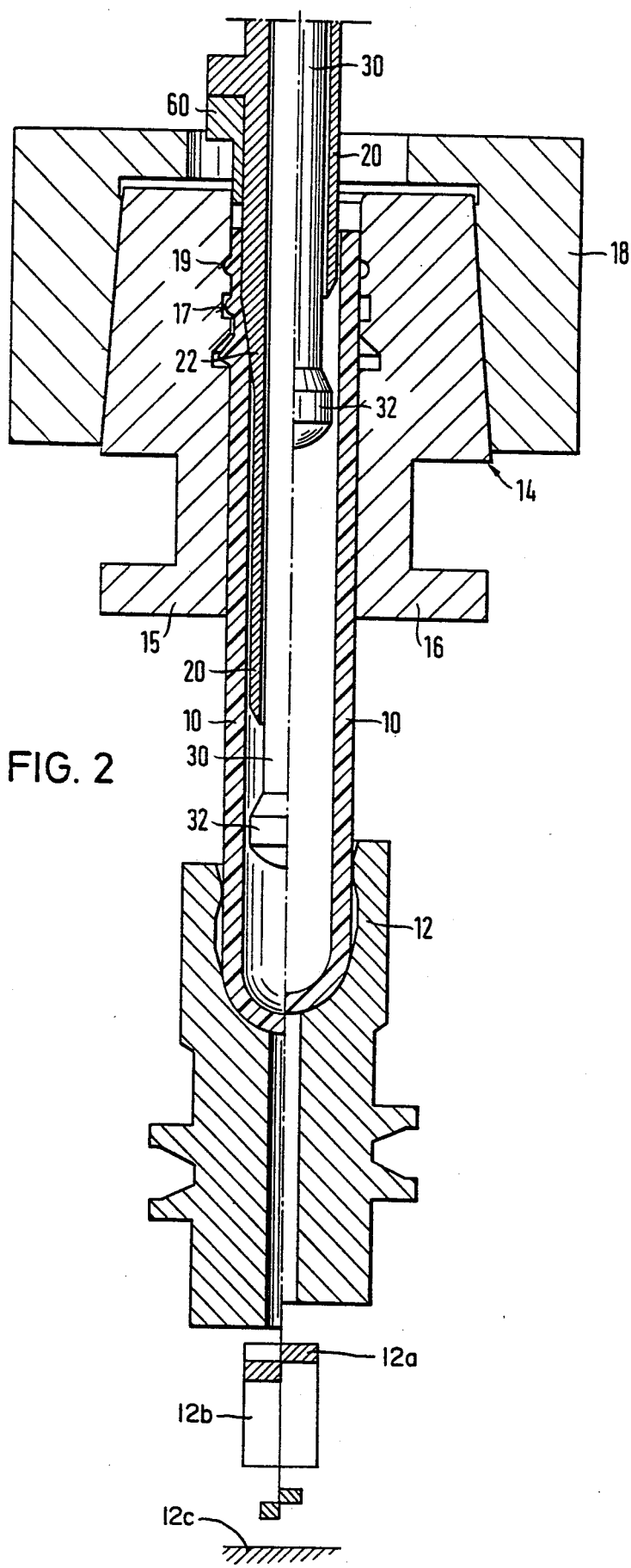
FIG. 2 is a cross-sectional view similar to FIG. 1, wherein the finish mold is closed and the forming mandrel is displaced from its retracted position (right hand portion) into its extended position (left hand portion) and FIG. 3 a cross-sectional view similar to FIG. 2, wherein the stretching pin is extended.

FIG. 2 shows the parison 10 being held in the sleeve 12 to be displaced upwardly into the upper transfer position. To this end the sleeve is axially moved by suitable drive means not shown. Thereupon the finish mold 14 is closed and the locking member 18 is brought into place as shown. In the right half portion of FIG. 2 the stretching pin 30 as well as the forming mandrel 20 are still in their upper position, whereas the lefthand portion of FIG. 2 shows the forming mandrel 20 being axially downwardly shifted during which motion the tapered wall 22 expands the upper finish portion of the heated parison and thus plastic material flowing into the recesses 17 of the finish mold. In particular the material enters the upper recess 19 leading to some clamping action between the material and the mold. The displacement of the material by means of the forming mandrel 20 is relatively little and is further limited to a region of the parison which lies outside of the neck portion of the bottle to be blown. Part of the material from the upper finish portion is axially downwardly displaced as well by the forming mandrel 20. To allow for this, the sleeve 12 gives way in a downward direction as shown in the lefthand portion of FIG. 2 taken in comparison with the righthand portion as by mounting sleeve 12 on piston 12a of air spring 12b, also as shown in FIG. 2. Together with the motion of the forming mandrel, the piston 38 and the stretching pin 30 are both downwardly displaced via the casing 26. Accordingly the position of the stretching pin 30 with respect to the forming mandrel 20 is not yet changed.

Thereafter air pressure enters the space above the piston 38 through the port 50. Reference is made to the righthand portion of FIG. 3, where the valve 40 is still closed. The piston 38 and the stretching pin 30 both move downwardly until the stretching pin contacts the closed bottom of the parison 10 whereupon the stretching pin is further downwardly displaced until it reaches its lower end position shown in FIG. 3 in which position the holding sleeve 12 is supported on an abutment 12c shown in FIG. 2. In this motion of the stretching pin the heated plastic material of the finish portion of the parison 10 outside the recess 19 is axially extended to obtain a thinner wall thickness. A comparison between the parison shown in FIG. 3 and shown in FIG. 2 clearly reveals the thinner wall thickness of the parison adjacent the profile 17 as well as below the profile 17 within the final neck portion of the bottle to be blown. Totally the parison is stretched at least ten percent of its original length so that the thinner cross section in the finish portion of the closure profile 17 and in the adjacent neck portion saves at least ten percent weight of plastic material.

As the holding sleeve 12 is prevented from further giving way by a rigid abutment 12c, the stretching pin 30 is in its final end position. The air pressure being applied to the piston 38 now moves the piston against the force of the spring 46, thus opening the blow valve 40 to allow air pressure to flow through the opening 50, ports 52, the bore 53, the ports 54, and the annular space 34 into the parison. This finally shapes the upper heated finish portion of the parison by blowing the plastic material which has been thinned in the previous axial stretching step into the recesses 17. This is shown in the lefthand portion of FIG. 3.

Finally the casing 26 may be moved a little downwardly as far as the abutment pin 56 and springs 58 allow for that. In this further motion the shoulder 60 being connected to the forming mandrel 20 enters from above into the finish mold 14 to form the upper plane of the finish portion flush. All the tools are retained in this position until the plastic material is sufficiently cooled and becomes solid. Then the parison is finished and is removed after pulling out the forming mandrel and the stretching pin and opening the mold sections.

We claim:
1. In an improved apparatus for making a parison for blowmolding a hollow body of the thermoplastic material comprising; a holding means for locating and securing the parison in a molding position, a finish mold disposable around a portion of the parison and an elongated forming mandrel having a central bore, said forming mandrel being displaceable in the longitudinal axial direction of the parison and insertable into the parison, the improvement comprising: a stretching pin located in the central bore of said forming mandrel, said stretching pin being outwardly extendable from said forming mandrel and axially displaceable in said bore with respect to said parison into contact with the bottom of said parison, and an actuating means for said forming mandrel and said stretching pin for first moving said forming mandrel and said stretching pin into said parison after said finish mold is disposed around a portion of said parison for locking said parison in said finish mold and subsquently moving said stretching pin in said central bore of said forming mandrel with respect to said parison and outwardly from said forming mandrel into contact with the bottom of said parison for stretching said parison by the contact with the bottom of the parison.

2. The apparatus of claim 1, wherein the forming mandrel includes a tapered shoulder at its inner most end, when inserted in the parison, to displace, in its extended position, the heated material of an upper finish portion of the parison into a recess of the finish mold.

3. The apparatus of claim 1 or 2, wherein an annular space for entering a pressure medium is provided between said forming mandrel and said stretching pin.

4. The apparatus of claim 1, wherein said holding means may be brought into engagement with an abutment limiting the extension of said stretching pin outwardly from said forming mandrel.

5. The apparatus of claim 1, wherein said stretching pin is driven by a piston which is slidingly guided in a bore of a casing carrying said forming mandrel.

6. The apparatus of claim 5, wherein said stretching pin is secured to a valve body which urged onto said piston by a spring, wherein said holding means may be brought into engagement with an abutment limiting the extension of said stretching pin outwardly from said forming mandrel, wherein an annular pressure space for entering a pressure medium is provided between said forming mandrel and said stretching pin, wherein said piston and said stretching pin are commonly displaced when said pressure medium is applied to the piston, and wherein said piston is lifted off said valve body when said holding means engages an abutment for entering said pressure medium in said annular space.

* * * * *

UNITED STATES PATENT AND TRADEMARK OFFICE
CERTIFICATE OF CORRECTION

PATENT NO. : 4,566,871
DATED : January 28, 1986
INVENTOR(S) : Norbert Hone et al It is certified that error appears in the above-identified patent and that said Letters Patent is hereby corrected as shown below:

In the heading of the patent insert---
    [30] Foreign Application Priority Data
    January 16, 1981 - [DE] Fed. Rep. of Germany . . .
    3101284

Column 1, Line 12, Cancel ". In" and insert---, in---;

Column 1, Line 13, Cancel "the invention";

Column 1, Line 14, Cancel ", in the" and insert ---. In the invention---;

Column 2, Line 49, Cancel "wherrein" and insert ---wherein---.

Signed and Sealed this

Fourteenth Day of October, 1986

[SEAL]

Attest:

DONALD J. QUIGG

*Attesting Officer*       *Commissioner of Patents and Trademarks*